Patented Sept. 1, 1942

2,294,778

UNITED STATES PATENT OFFICE 2,294,778

PROCESS OF RECOVERING PURE SODIUM CARBONATE MONOHYDRATE FROM BRINES

Alexis C. Houghton, Bartlett, Calif., assignor to Frederic A. Dakin, Boston, Mass., as trustee No Drawing. Application February 13, 1940, Serial No. 318,748

3 Claims. (Cl. 23—38)

This invention relates to the recovery of pure sodium carbonate from the brines and deposits of Owens Lake and other similar alkali deposits which are contaminated with sodium sulphate. In my co-pending application Serial No. 73,498, filed April 9, 1936, pursuant to which U. S. Letters Patent No. 2,193,817 were granted to me on March 19, 1940, I have shown that although the transition point from the heptahydrate to the monohydrate in a saturated solution of sodium carbonate which is also saturated or substantially saturated with sodium chloride is 23.6° C., at which temperature the solution contains 16.3% $Na_2CO_3$, such solution can readily be supersaturated into the metastable field of the heptahydrate up to 31° C. or so, at which temperature the concentration of sodium carbonate is 21% $Na_2CO_3$. By seeding such a brine with crystals of sodium carbonate monohydrate, or by warming it up a few degrees above 31° C. to cause the spontaneous formation of nuclei of sodium carbonate monohydrate, this supersaturation is readily released, and when solubility equilibrium has been reached a crop of pure sodium carbonate monohydrate is precipitated. The sodium carbonate content of the solution in this operation falls from 21% $Na_2CO_3$ to about 15.5% $Na_2CO_3$ at a temperature of 31° C., or less if the temperature is higher, thus precipitating a crop of pure monohydrate of about 35% of the sodium carbonate of the brine. If the 21% $Na_2CO_3$ brine contains 2.5% or less of sodium sulphate, no sodium sulphate is precipitated with the monohydrate, which separates out in a pure condition free from other crystallized impurities. It may be filtered, washed, and dried directly to anhydrous sodium carbonate to make a 58% $Na_2O$ soda ash of high density.

I will now describe how such a process may best be carried out in commercial operation.

The 21% $Na_2CO_3$ brine supersaturated with respect to monohydrate may be prepared by one of the several methods described in my co-pending application already mentioned, one of which is to pump from the lake to the plant a mixture of brine and salts containing an excess of the solid phases of sodium carbonate decahydrate or heptahydrate and sodium chloride necessary for the saturation, but free from sodium carbonate monohydrate, and then agitate the mixture at a temperature of 31° C. for a sufficient length of time for the brine to reach saturation up to 21% $Na_2CO_3$, and then separate the clear brine from the excess solids. The precipitation of monohydrate in this clear 21% $Na_2CO_3$ brine is then started by seeding with monohydrate crystals, or by warming it up sufficiently (40°-45° C.) to start up the precipitation spontaneously. It will be unnecessary to warm up all of the brine to start precipitation. Such warming up may be local, or a small portion of the brine may be withdrawn from the vat, heated to 40°-45° C. to form monohydrate crystals, and then returned to the vat to seed the large body of supersaturated brine therein. The mixture is allowed to come to solubility equilibrium while being maintained at a temperature above 24° C. in a settler of the Dorr type, and the thickened monohydrate precipitate is drawn off from the bottom of the settler to suitable filters or centrifugals, where it is washed practically free from adhering mother liquor, and then dried at moderate heat to anhydrous sodium carbonate. The mother liquor containing about 15.5% $Na_2CO_3$ is then re-saturated with sodium carbonate decahydrate and sodium chloride containing salts from the lake and the process repeated.

My preferred method of operation, however, in this process is to obtain a large stock of fairly pure crude decahydrate close to the plant, as described in U. S. Letters Patent No. 1,853,275, issued to me and James G. Miller. In that patent we have described a method of obtaining such a stock of crude decahydrate capable of being recrystallized or purified by other means, which consists in filling large storage ponds or crystallizing vats near to the plant, and capable of being drained, with naturally occurring brines from the lake at the season of the year when they contain a maximum concentration of sodium carbonate and a minimum content of sodium sulphate, and allowing such brines to crystallize out a large crop of sodium carbonate decahydrate, low in sodium sulphate, by subjecting them to the winter temperatures prevailing in the Owens Lake region. The mother liquor is then drained away from the vats as completely as possible, leaving a substantial crop of crude decahydrate, which may have a composition between the following ranges:

|  | Per cent |
|---|---|
| $Na_2CO_3.10H_2O$ | 90.8 to 85.5 |
| $Na_2SO_4.10H_2O$ | 1.6 to 3.4 |
| $Na_2B_4O_7$ | .3 to 1.0 |
| NaCl | 1.4 to 2.0 |
| Moisture | 5.9 to 8.1 |
| Total | 100.0  100.0 |

This material may be conveyed to the plant, or it may be melted up with steam heat and pumped to the plant to saturate a brine up to 21% $Na_2CO_3$. Preferably, however, a face is opened up in the bed of decahydrate, which may have a depth of 5 feet or more, by means of a power shovel, and the brine under pressure from the lake or other source played against this face from suitable nozzles to "hydraulic" it into a suspension of brine and decahydrate. This mixture containing a sufficient excess of decahydrate crystals is pumped to the plant. In addition there is pumped from the surface of the lake near the plant, a mixture of surface salts, such salts containing 80% or more of solid sodium chloride. Should such surface salts contain crystals of sodium carbonate monohydrate in the warmer weather, it will be necessary to get rid of these. This is done simply by adding enough water to the mixture of surface salts in the plant to completely dissolve any monohydrate crystals, but not enough to dissolve all of the sodium chloride present. As these surface salts contain 80% or more of sodium chloride, a large excess of solid sodium chloride will remain undissolved. After decanting off the mother liquor containing the sodium carbonate in solution, the remaining sodium chloride is ready for use. Enough of these sodium chloride containing salts free from monohydrate is added to the suspension of decahydrate crystals in the brine to maintain saturation in sodium chloride. The whole mass is then agitated at a temperature of 28° to 31° C. until 19% to 21% $Na_2CO_3$ brine is obtained, and the excess salts settled out or filtered off. The clear brine then has approximately the following composition:

| | |
|---|---|
| Specific gravity | 1.369 |
| Per cent $Na_2CO_3$ | 20.9 |
| Per cent $B_2O_3$ calculated as $Na_2B_2O_4$ | 3.1 |
| Per cent $Na_2SO_4$ | 2.0 |
| Per cent NaCl equivalent | 12.0 |
| Per cent water and other constituents | 62.0 |
| Total | 100.0 |

This clear brine at a temperature of 31° C. is seeded with sodium carbonate monohydrate crystals to release the supersaturation and to precipitate out sodium carbonate monohydrate, and the mixture allowed to come to solubility equilibrium at around this temperature, or slightly higher if a larger yield of the monohydrate is desired. As the mixture is rather "thin" in the amount of solids carried, a thickener of the Dorr type is preferably used for this operation. As this holds a large volume of liquid, necessitating a fairly long time in which the precipitate is in contact with the mother liquor, it would serve the double purpose of allowing the mixture to come to solubility equilibrium with respect to monohydrate, and also more readily handled on a filter of the rotary type or on a centrifuge. The monohydrate, and also to thicken the precipitated monohydrate so that it could be more readily handled on a filter of the rotary type or on a centrifuge. The monohydrate is drawn from the bottom of the thickener to the filter, and washed on the filter with a limited amount of water until it is practically free from adhering mother liquor impurities. The recovery of sodium carbonate in the washed monohydrate is over 30% of the $Na_2CO_3$ contained in the 21% $Na_2CO_3$ brine, and the composition of the mother liquor is approximately as follows:

| | |
|---|---|
| Per cent $Na_2CO_3$ | 15.5 |
| Per cent $Na_2B_2O_4$ | 3.4 |
| Per cent $Na_2SO_4$ | 2.4 |
| Per cent NaCl equivalent | 13.0 |

This mother liquor is re-cycled back to dissolve more decahydrate. It is pumped under some pressure to the hydraulicking nozzles for sluicing down more decahydrate in the crystallization vats, and the operation already described repeated to re-form the 21% $Na_2CO_3$ brine for further precipitation of monohydrate. The amount of mother liquor will build up in volume in this operation on account of the amount of water in the decahydrate, and it will thus be necessary to discard about 25% of this mother liquor at each re-cycling operation. Over a part of the year when cold weather prevails, from November to March, or about four months, this mother liquor discarded may be discharged into the crystallizing vats as they are emptied of decahydrate, as during these months the weather will be cold enough to crystallize out a large crop of decahydrate from this strong sodium carbonate brine, which can be used as already described. For the balance of the year the excess mother liquor would either be discharged to the lake or stored in empty decahydrate storage vats to await the advent of cold weather again to reduce the amount of fresh brine to be pumped from the lake for the following season. For the year round operation the recovery of sodium carbonate of the decahydrate as pure monohydrate would be 70% or better.

The washed monohydrate from the filters is dried to anhydrous soda ash in a suitable dryer, and the ash would contain over 99% $Na_2CO_3$, be free from silica, borates, or organic coloring matter, and be a dense ash.

The crystallizing vats are filled with brine from the lake in the months of July, August, September, and part of October, which will range in composition somewhat as follows:

| | |
|---|---|
| Specific gravity | about 1.345 |
| Per cent $Na_2CO_3$ | from 15.2 to 16.4 |
| Per cent $Na_2B_2O_4$ | from 3.0 to 2.8 |
| Per cent $Na_2SO_4$ | from 2.2 to 1.8 |
| Per cent NaCl equivalent | from 14.2 to 13.9 |

The crystallizing vats are made large enough to hold a year's supply of decahydrate for the desired production, with some excess for safety. They can be readily filled with sufficient brine for a year's supply of soda during the three or four months mentioned as being the most favorable.

In the spring and summer months the decahydrate in the crystallizing vats being exposed to dry air will effloresce on the surface, forming monohydrate, which material must of course be avoided in the saturating operation. This difficulty can be overcome by melting up the decahydrate in its own water of crystallization. Any monohydrate present would be insoluble in the melted decahydrate, and could be settled out or filtered off in the plant before the saturating operation. Or in making the saturation the temperature could be lowered sufficiently below the transition point of monohydrate to heptahydrate, or below 23.6° C., and agitated at this lower temperature for a sufficient length of time to allow the monohydrate to hydrate completely to the heptahydrate, and then the saturation up to 21% $Na_2CO_3$ proceeded with. Or the difficulty could be overcome most simply by adding to the liquefied decahydrate containing monohydrate crystals in suspension just enough water to effect complete solution of the monohydrate.

This process is also applicable, but less economical, to a decahydrate containing much larger amounts of sodium sulphate. In this case in making the saturation up to 21% $Na_2CO_3$ at 31° C., sufficient time would be allowed for the reaction of sodium carbonate with sodium sulphate to form the double salt $Na_2CO_3 \cdot 2Na_2SO_4$, according to the principles outlined in U. S. Letters Patent No. 1,853,275. The double salt is fairly insoluble at 31° C. in a brine saturated with sodium carbonate and sodium chloride, and would thus settle out with the excess solids used for the saturation, and the sodium sulphate content of the clear brine ready for the monohydrate precipitation would be reduced to about 2.5% $Na_2SO_4$, which is sufficiently low so that no sodium sulphate will be thrown down when the monohydrate is finally precipitated. However if the brine from the lake is pumped in the months already mentioned, there would be no danger of encountering high sulphate brines such as would give a high percentage of sodium sulphate in the decahydrate in the crystallizing vats, as such high sulphate brines only occur in the lake in the colder weather, when they would not be used for crystallizing out decahydrate in the vats.

The recovery of the sodium carbonate originally contained in the brine pumped from the lake to the crytsallizing vats as marketable soda ash in this process is over 50%. For instance, if high carbonate brines are pumped from the lake in the months mentioned, and then allowed to stay in the crystallizing vats before draining off the mother liquor until the temperature of the brine has fallen to 5° C.—a condition very readily obtained in the cold winter months—there will be about 80% of the sodium carbonate in the brine crytsallized out as decahydrate. It has already been mentioned that the recovery of the sodium carbonate as soda ash from the decahydrate will be around 70% for the year round operation. The overall recovery as soda ash of the sodium carbonate of the brine originally pumped from the lake is therefore well over 50%, making the process thoroughly commercial.

What I claim is:

1. The method of preparing pure sodium carbonate monohydrate which consists in agitating Owens Lake brine with a mixture of salts containing an excess of the solid phases of sodium chloride and any form of the normal sodium carbonate except sodium carbonate monohydrate, while warming the mixture to a temperature between 28° and 31° centigrade, whereby such prepared brine contains from 19% to 21% $Na_2CO_3$, is saturated with sodium chloride and highly supersaturated with respect to sodium carbonate monohydrate, removing undissolved matter from the brine, and then releasing the supersaturation of the clear brine with respect to sodium carbonate monohydrate by raising the temperature of at least a portion of the brine to a temperature sufficiently above 31° centigrade to cause it to spontaneously separate out sodium carbonate monohydrate, maintaining the mixture at a temperature over 24° centigrade for a sufficient length of time to come to solubility equilibrium with respect to the monohydrate, separating the precipitated pure monohydrate from the mother liquor, and washing same substantially free from adhering mother liquor impurities.

2. The method of preparing pure sodium carbonate monohydrate which consists in agitating Owens Lake brine with a mixture of salts containing an excess of the solid phases of sodium chloride and any form of the normal sodium carbonate except sodium carbonate monohydrate, while warming the mixture to a temperature between 28° and 31° centigrade, whereby such prepared brine contains from 19% to 21% $Na_2CO_3$, is saturated with sodium chloride and is highly supersaturated with respect to sodium carbonate monohydrate, removing undissolved matter from the brine, and then releasing the supersaturation of the clear brine with respect to monohydrate by seeding it with crystals of sodium carbonate monohydrate, maintaining the mixture at a temperature over 24° centigrade for a sufficient length of time to come to solubility equilibrium with respect to the monohydrate, separating the precipitated pure monohydrate from the mother liquor, and washing same substantially free from adhering mother liquor impurities.

3. The method of preparing pure sodium carbonate monohydrate which consists in agitating a brine which is saturated with sodium carbonate and sodium chloride and contains also some sodium sulphate with a mixture of salts containing an excess of the solid phase of sodium chloride and of any form of the normal sodium carbonate except the monohydrate, while warming the mixture to a temperature between 28° and 31° C., whereby such prepared brine acquires a content of from 19% to 21% $Na_2CO_3$, is saturated with sodium chloride and highly supersaturated with respect to sodium carbonate monohydrate, removing the undissolved matter from the brine, releasing the supersaturation of the clear brine with respect to sodium carbonate monohydrate to cause it to separate out sodium carbonate monohydrate, maintaining the mixture at a temperature over 24° C. for a sufficient length of time to come to solubility equilibrium with respect to the monohydrate, separating the precipitated pure monohydrate from the mother liquor, and washing the same substantially free from mother liquor impurities.

ALEXIS C. HOUGHTON.